Patented July 6, 1926.

1,591,406

UNITED STATES PATENT OFFICE.

DAVID F. SHOPE, OF PORTLAND, OREGON.

PROCESS FOR MAKING CORRUGATED-FACED CEMENT BRICK.

No Drawing.   Application filed November 18, 1924.   Serial No. 750,711.

The invention relates to the process of waterproofing and treating faced cement brick having corrugations upon the exposed faces of the brick when laid and upon other desired surfaces and consists of first forming the brick in suitable molds from a semi-wet mixture of cement and suitable aggregate and the tamping of the same within the mold. The forming of a corrugated surface upon one, or more, of the faces of the brick, by suitable means; the wetting of the corrugated surface with a fine atomized spray, the sprinkling of a cementitious material, and coloring matter, if desired, in a dry state, upon the wetted, corrugated surface, and the wetting of the same by the application of a fine atomized spray and the increasing of the density of the wetted surface, as by the drawing of a fine toothed steel brush thereacross parallel with the corrugations upon the surfaces being treated.

Having thus described my process in detail I wish to make the following claims, therefor—

1. The process of making corrugated faced cement brick, consisting of forming the brick in a suitable mold, as by tamping, from cement and a suitable aggregate in a slightly moistened state; forming a corrugated surface thereon, wetting the corrugated surface by atomization, sprinkling dry cement, and coloring matter if desired, upon the wetted surface, again wetting the surface by atomization, and lastly drawing a fine steel brush across the same, parallel with the corrugations, thereby increasing the density of the surface so treated.

2. The process of making corrugated faced cement bricks, consisting of forming the brick body, having corrugated surfaces, in a suitable manner, from a suitable aggregate; wetting the corrugated surfaces, sprinkling thereon cement and coloring matter in a suitable thickness, atomizing the added material to saturation, and drawing a fine steel brush across the same parallel with the corrugations, thereby increasing the density of the surface so treated.

DAVID F. SHOPE.